Feb. 16, 1937.  C. W. READE ET AL  2,070,841
LIQUID HANDLING MECHANISM
Original Filed Nov. 11, 1931   5 Sheets-Sheet 1

Inventor
Carleton W. Reade
Henry T. Scott
By
Geo E Kirk
Attorney

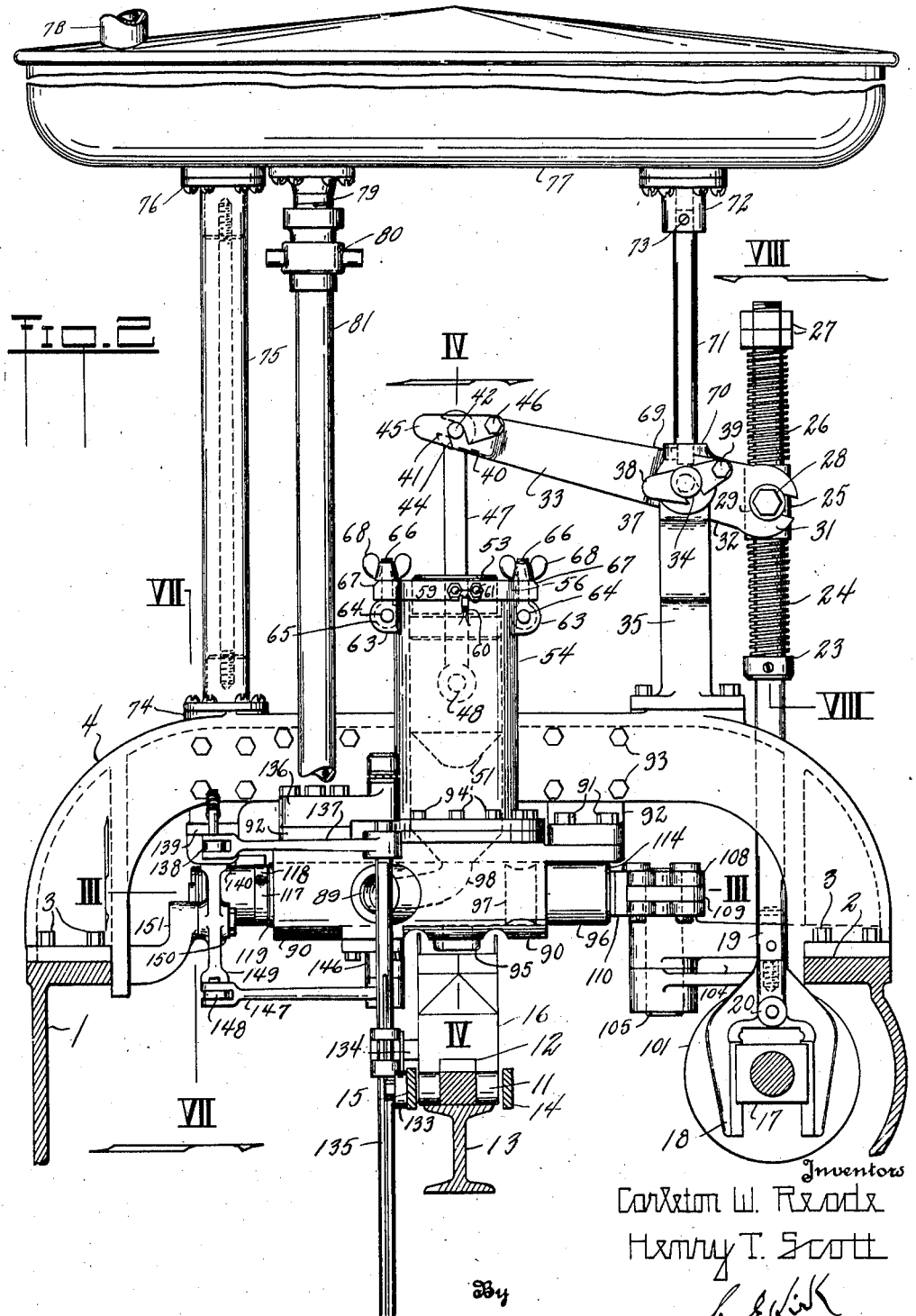

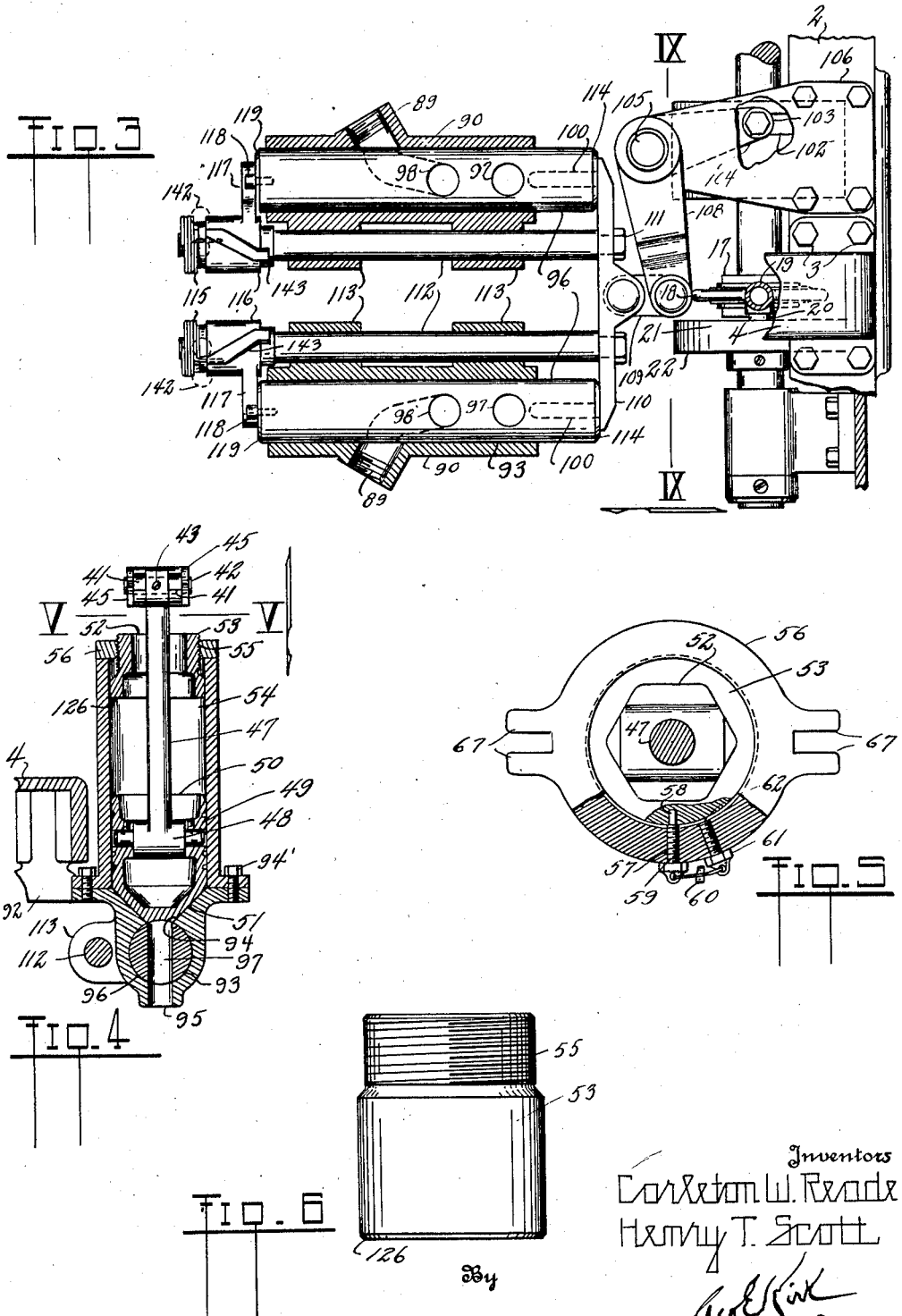

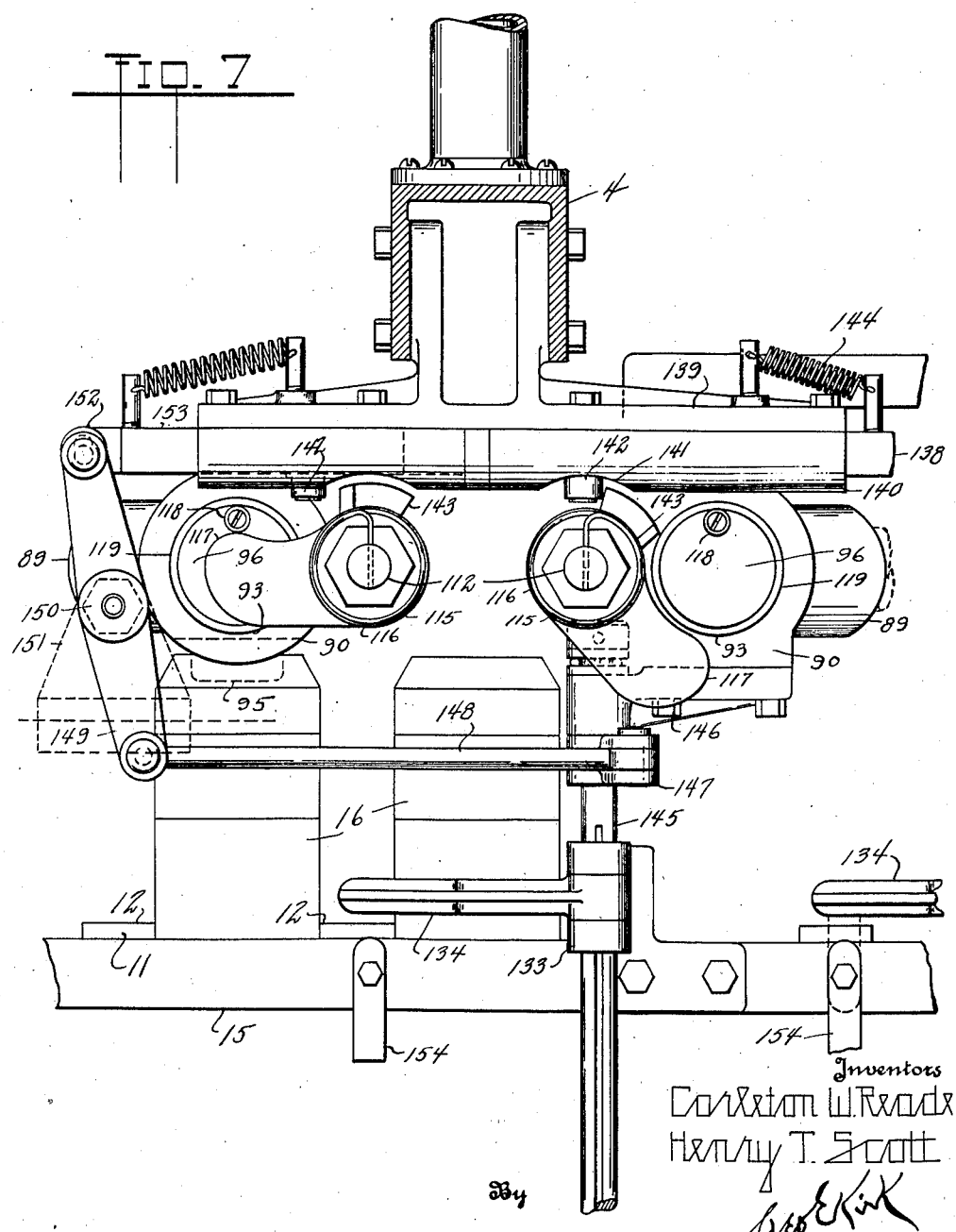

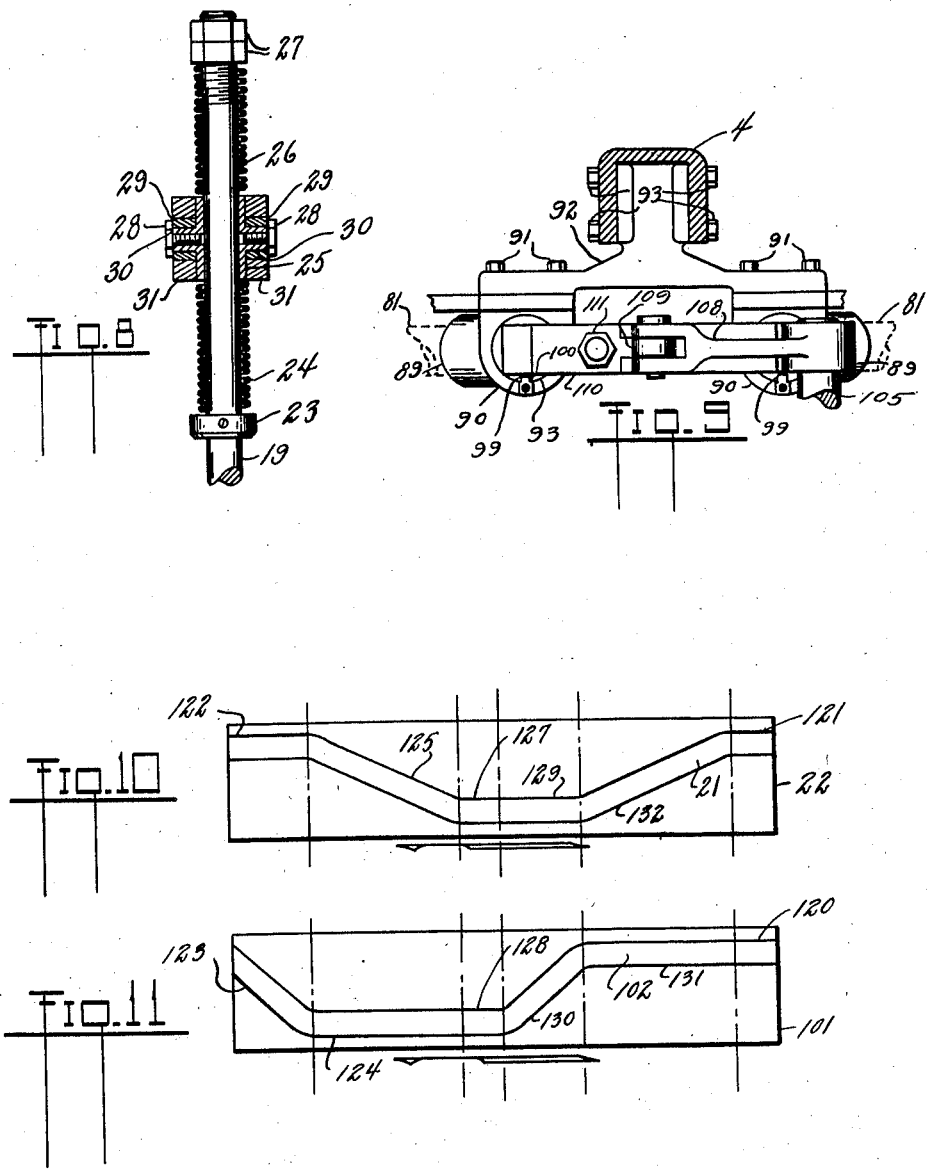

Patented Feb. 16, 1937

2,070,841

UNITED STATES PATENT OFFICE 2,070,841

LIQUID HANDLING MECHANISM

Carleton W. Reade and Henry T. Scott, Toledo, Ohio, assignors to The American Paper Bottle Company, Toledo, Ohio, a corporation of Ohio Application November 11, 1931, Serial No. 574,296
Renewed July 27, 1936

18 Claims. (Cl. 226—99)

This invention relates to separating bulk material into predetermined minor quantities.

This invention has utility when incorporated in filling equipment, especially for measuring liquids.

Referring to the drawings:

Fig. 2 is a fragmentary side elevation of the apparatus of Fig. 1 from the supply or container receiving side thereof;

Fig. 3 is a section on the line III—III, Fig. 2, looking in the direction of the arrow, and showing the valves in position for the liquid supply to flow into the measuring chamber;

Fig. 4 is a section on the line IV—IV, Fig. 2, showing the piston and cylinder device in liquid discharging position as to the valve therefrom;

Fig. 5 is a section on the line V—V, Fig. 4, with a portion broken away to show details of the sealing;

Fig. 6 is a detail view of a substitute piston abutment or cylinder head for lesser measurement effect;

Fig. 7 is a section on the line VII—VII, Fig. 2, looking in the direction of the arrow;

Fig. 8 is a section on the line VIII—VIII, Fig. 2, showing the yieldable transmission connection;

Fig. 9 is a section on the line IX—IX, Fig. 3;

Fig. 10 is a developed view of the piston operating cam; and

Fig. 11 is a developed view of the valve operating cam.

Figure 1:
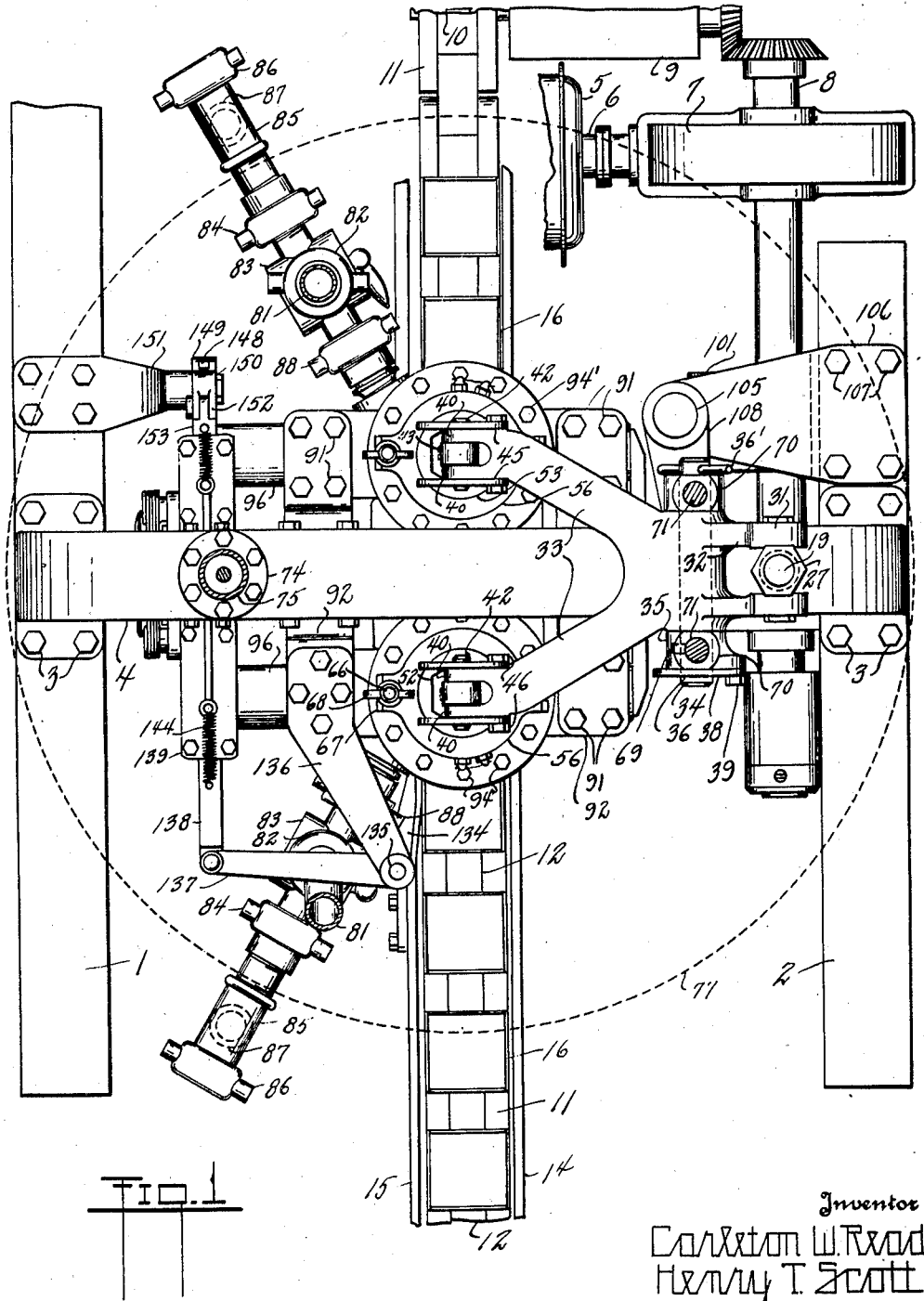
Fig. 1 is a plan view, with parts broken away, of an embodiment of the invention in apparatus for measuring definite quantities of liquid from a bulk supply, as of milk, fruit juices, etc., and delivering such into containers.

In an installation, parallel frame members 1, 2, have bolts 3 assembling arch or bridge 4 therebetween, as the primary carrier for the filler or measuring apparatus of this disclosure. Motor 5 (Fig. 1) as continuously operating is effective thru shaft 6 and speed reduction gearing 7 of the worm type to rotate shaft 8, from which there is transmission 9 to gearing 10 operating conveyor 11 of the endless type having thereon blocks or flights 12. The upper reach of this conveyor 11 rides along on I-beam 13 (Fig. 2) as a support in the region of the carrier or bridge 4. Guide bars 14, 15, along the sides of this upper reach of the conveyor 11, serve to locate and keep in position on the conveyor containers 16 as an endless series in their intermittent travel empty under the bridge 4, there to be charged with a predetermined quantity of liquid.

The shaft 8, in the vicinity of the bridge 4, has thereon block 17 coacting with fork 18 of upwardly extending rod 19. Fixed on this rod 19 adjacent the fork 18 is roller 20 coacting with groove 21 in cam 22 fixed for rotation with the shaft 8.

The upwardly extending rod 19 (Fig. 8) has fixed thereon collar 23 against which abuts helical compression spring 24 extending to sleeve or block 25, which on its opposite side is engaged by a second helical compression spring 26. The compression of these springs is adjusted by nuts 27 on the threaded terminal portion of this rod 19. Bolts 28 mount rollers or bushings 29 for free rotation on studs 30 of the sleeve 25. Forks 31 of short arm 32 of lever having long arms 33, coact with the rollers or bushings 29 as this lever is rocked on its fulcrum 34 (Figs. 1, 2) mounted in bracket 35 rising from the carrier 4. Groove 36 adjacent the bracket 35 in a protruding end of the fulcrum pin 34 is engaged by fork 37 of plate 38 having pivotal connection by bolt 39 with the bracket 35. A quick detachable connection is thus provided at this fulcrum for the lever or walking beam 32, 33, while removal of the bolts 28, permits the rollers 29 to clear the forks 31. Cross rod 36' is a handle for permitting ready withdrawal of the pin 34.

For twin filler operation, or for handling more than one measuring chamber, the lever may have more than one branch or arm 33. The showing herein is a Y-form for two fillers in sequence along the conveyor 11. The free ends of the arms 33 are forked. Each arm 40 of the fork has a notch or slot 41 into which may be thrust a pin 42 held by screw 43 with rod 47 and protruding to be engaged by notches 44 in plates 45 pivotally mounted by bolts 46 to swing at an angle to the notches 41, thereby completing holding bearings in a quick detachable assembly for the pin 42.

From the pin 42 there is downwardly extending piston rod 47 to pivotal connection 48 with piston 49 having upwardly extending rim or abutment 50 and downwardly extending tapered terminal active face portion 51. The piston rod extends thru opening 52 in ring 53 having depending skirt or abutment opposing the piston abutment 50 in limiting the upward travel of the piston 49 in cylinder 54. The ring 53 has externally threaded portion 55 coacting with internally threaded ring or cylinder head member 56 (Figs. 4, 5). The official sealer may determine the exact lift travel which the piston 49 is to have in the cylinder 54 for the predetermined volume, whether liter, pint, or other measure, or fraction thereof. At such adjustment thru tapped hole 57 in the member 56, a drilling tool is used to form seat 58 in the ring 53. The sealer may then locate bolt 59 in the hole 57 and with seal 60 connect the bolt 59 with bolt 61 in tapped hole 62. The accuracy of this adjustment as fixed need not be disturbed, even upon occasion to remove the piston 49 from the cylinder 54. Such removal is quickly possible, for lugs 63 on the cylinder 54 have pins 64 thru eyes 65 of bolts 66 thus hinged to swing upwardly between prongs 67 of the member 56 and there have the upwardly protruding termini engaged by wing nuts 68. These wing nuts 68 may be readily backed off from head clamping position, for the removal of this cylinder head. The plates 45 at the lever arm 33, may swing to release the pin 42 so that the piston 49 and its rod 47 are disconnected from the unit.

Set screws 69 in bosses 70 anchor legs or rods 71 upwardly extending into sockets 72 and there anchored by set screws 73. Boss 74 on the carrier 4 provides seat for third leg 75 to socket 76. These sockets 72, 76, are fixed with the underside of tank 77 as a reserve or bulk liquid supply reservoir, which may be replenished by flow thereinto from supply pipe 78. From this tank 77 there is outlet fitting 79 connected by union 80 to down pipe 81, instead of having such pipe 81 connected by the union 80 directly with the pipe 78. By having this reserve tank 77 adjacent the filler devices, there is opportunity for checking as the available bulk quantity is depleted. A down pipe 81 extends to each filler unit.

The down pipe 81 has union 82 providing connection to three-way valve 83. Outward from the unit this valve 83 has connection by union 84 to T-fitting 85 having terminal cap 86. Drain pipe 87 is downward from the fitting 85. Toward the unit from the valve 83 there is union 88 connecting the liquid supply with passage 89 in housing 90. The housing 90 is connected by bolts 91 to bracket 92 (Fig. 9) assembled by bolts 93 with the carrier 4. Bolts 94' connected the cylinder 54 with the valve housing 90 (Figs. 1, 2).

The valve housing 90 has a sleeve portion 93 to which the passage 89 extends, as away from alignment with the cylinder 54. In alignment with the cylinder 54, the housing 90 has cylinder head tapered section 94 as a cylinder discharge port to the sleeve 93. In alignment below this tapered section 94, is outlet port 95 from the sleeve to spill the measured liquid from the filler for flow directly into a container 16, whether such be a rectangular paper bottle as shown, or other container, say of metal or glass. In the sleeve 93 (Figs. 2, 3) is a reciprocable valve member or plug 96, having outlet port 97 for registry between the section 94 and the port 95, and normally filled inlet port 98 from the passage 89 to communicate with the section 94.

The plug valve 96 has its travel limited to reciprocation and in a definite range for two terminal positions. The plug 96 may not rock in the sleeve 93, for the sleeve 93 has therein inwardly projecting pin 99 coacting in groove or way 100 as a spline. The positioning of the plug is by pushing first from one end and then from the other in alternately locating the plug for a filling position as to the cylinder 54 or measuring chamber, and then for such chamber to have its measured quantity spill therefrom as the supply is cut off.

Fixedly mounted on the shaft 8 adjacent the cam 22, which is a face or radial cam, is valve control cam 101 having in its cylindrical surface circumferential groove 102 with which coacts roller 103 on horizontally oscillatable arm 104 fixed with vertically extending fulcrum pin 105 mounted in bracket 106. This bracket 106 is anchored by bolts 107 with the member 2. The pin as protruding from the upper side of the bracket 106 has mounted fixedly thereon arm 108 connected by link 109 with crosshead 110 (Figs. 3, 10). Bolts 111 assemble the crosshead 110 with rods 112 reciprocable in eyes or guide lugs 113 extending from the housing 90. The crosshead 110 is thus located against end 114 of the plug 96 for thrusting the plug 96 from register position of the port 98 whereby filling of the chamber 54 has been effected, to register position for the port 97 between the cylinder 54 and the outlet port 95 for the interval of positive discharge of the accurately measured quantity of liquid from the chamber 54 into a container 16.

The rod 112 is parallel to the plug 96 and extends therebeyond remote from the crosshead 110 where torsion spring 115 from the rod 112 extends to engage sleeve 116 having arm 117 (Figs. 3, 7) therefrom normally held by said spring against pin 118 in end 119 of the plug 96 away from the end 114. Normal recover movement of the crosshead 110 pulls the rods 112 therewith. In this movement the arms 117 push the plugs 96 from registering at discharge position to registering at filling position from the cylinder 54.

The cycles for operations in the valve movements and for the piston travels are established and maintained positively as to general synchronism and sequence, due to a common drive from the shaft 8. The cam 101 (Fig. 11) at the portion 120 is a period of rest or quiet or dwell at section 121 of the cam 22 for the piston. The pushes for the plug valves are positive, while the piston control is yieldable due to the springs 24, 26. The dwell, say for about 29° as to the circumference of the cam, is an insurance for yieldable seating of the piston 49 taper portion 51 into taper head 94 even to position abutting the plug 96 about the port 97. This means that the measured quantity of liquid is not waited upon for a gravity flow-off, but is pumped or pushed out at the adjusted action for the yielding of the springs 24, 26, to insure evacuation of the cylinder 54 at the speed of operation, which in practice under the disclosure is twenty-three fillings of pints per minute.

While the piston 49 is still seated against the plug 96, and so held by cam portion 122 (Fig. 10) of the cam 22, the cam 101 has portion 123 effective to shift the plug 96 so that the port 97 is moved away from registry between the cylinder 54 and the post 95, and the port 98 is in register between the passage 89 and the cylinder 54. Portion 124 of the cam 101 then holds the plug 96 in such position, while cam portion 125 of the cam 22 effects ascent of the piston 49 with the springs 24, 26, as a yieldable transmission to effect insured contact of piston abutment 50 with stop abutment 126 (Fig. 4). This definite displacement travel to the sealer's determined position effects suction inflow of the liquid under head for fully filling such measuring chamber at a rapid rate for piston travel. Portion 127 may be a 29° catch-up for the piston to become quiet or have a dwell, with the valve having rest portion 128 at the same interval. During portion 129 the cam 22 holds the piston 49 for the full capacity position of the chamber 54, while the cam 101 has portion 130 shift the valve 96 to cut off supply from the pipe 81, and connect discharge port 95 with the cylinder 54.

The pumping action or suction intake for filling the measuring chamber or cylinder 54 is one to accelerate the speed of possible machine or filler operation, instead of depending upon gravity flow alone. Likewise there is even more positive flow-off or discharge, permitted by the ample cross-section ports relative to the volume of material being handled per measured unit. The fully charged measuring chamber 54 is in open or spill position for the plug 96 as held by cam portion 131, and the cam 22 is now effective thru portion 132 to cause the piston 49 to descend into abutting relation with the plug 96 about the port 97 in thus evacuating the cylinder 54. The dwell portion 121 of the cam 22 is at the completion of this filler operation for a container 16, before there is a repetition of the cycle. The gearing 10 preserves a sequence for the conveyor 11 to step up the container series during the filling interval for the chamber 54.

In the event a container 16 be missed by the charging mechanism for the conveyor 11, there is no occasion to slop a charge from the filler unit, for such is automatically rendered inactive. Bracket 133 (Fig. 2) is mounted on the bar 15 to position arm 134 splined on upwardly extending rod 135 having upper bracket connection 136 to the frame or bracket 92. Adjacent thereto, arm 137 from the rod 135 extends to slide 138 mounted by bracket 139 to be carried by the bridge 4. This bracket 139 carries sleeve 140 for the slide or plunger 138. Cut out portion 141 from this sleeve allows pin or roller 142 to protrude for engaging guide or arc projection 143 from the sleeve 116. Helical tension spring 144 between the slide 138 and the bracket 139 serves as yieldable means to maintain the arm 134 to ride against a container 16. As a container 16 is missed, the arm 134 swings over the conveyor and the roller pin 142 acts in the recover travel of the sleeve 116 away from the plug end 119 to rock the arm 117 away therefrom. Thus, when the pull stroke for shifting the plug 96 to supply position is to occur, the arm 117 slides alongside and the plug 96 is left at the spill position.

When the filler units are in multiple, the automatic cut out for the filler may respond thereto. In fact with multiple fillers, less than all may be used, by anchoring the unused cut out in the trip position, or even allowing the operation of the conveyor to compensate therefor, if the step of the conveyor be not adjusted to the reduced rate. In some operations, there may be fractional fillings of the container, when the conveyor may operate at steps for the portion of one measuring to be deposited upon the quantity of a preceding measuring of the same or a different substance, thus building up the charge of the container.

An additional arm 134 (Fig. 7) is employed in the twin unit installation. This arm 134, at the bracket 133, is on rod 145, extending upward not so high as the rod 135. Bearing 146 for the upper end of the rod 145 is in the housing 90, adjacent which bearing, the rod 145 has arm 147 from which extends link 148 to the lower extremity of lever 149 having its fulcrum bearing 150 in bracket 151 (Figs. 1, 2) mounted on the frame 1 adjacent the carrier 4. The upper end of this lever 149 has loose connection 152 with slide 153 similar to the slide 138 but disposed oppositely thereto. The roller 142 in Fig. 7 at the left is shown in inoperative position. When the slide 138 is shifted to the right to bring the right hand roller 142 to inoperative position, the left hand roller 142 of the slide 153 is shifted to operative position above the rod 112 and acts similarly to the roller 142 on the slide 138 for effecting cut out of the pushing operation of the arm 117 on the companion plug valve 96.

In the general operation of the installation of this disclosure, supply of containers 16 on the conveyor 11, is stepped along, say a container distance in the twin filling. The motor 5 is operating continuously to effect not only the intermittent travel of the conveyor 11, but two cycles of operation for the filling operations. Under these circumstances, it is in order not only to provide the supply of containers to receive the measured quantities or charges, but a supply of the bulk material, as grapefruit juice, milk, or other substance. The supply pipe 81 is a feed line source for the bulk material.

The shaft 8 has a continuous rotation at a reduced speed from the motor 5. As heretofore suggested, a speed adopted with success in practice has been above 20 R. P. M. It has been suggested that 29° has been used for the dwell intervals. In such allotment, 53° has been used for the plug valve transit for shifting from filling to discharge and for shifting from discharge to filling position. This leaves an interval of 98° for the piston suction or intake stroke and a like interval for the piston to evacuate the cylinder 54.

With the cam 22 effective to hold the piston 49 at the bottom or empty cylinder position, the cam 101 may shift the plug valve 96, due to the cam portion 123, for moving the port 97 away from the cylinder 54 and connecting the passage 89 by way of the port 98 to the cylinder 54. The cam 22 then has its portion 125 effect the up or suction stroke for the piston 49. After the dwell and while the piston is still at the position for the cylinder 54 to remain fully charged, there is a reverse shifting of the plug 96 by the cam 101, effected by the cam portion 130. This disconnects the cylinder 54 from the passage 89 and by the port 97 connects the cylinder to the port 95. The cam 22 then has its portion 132 effect descent of the piston 49 to evacuate the cylinder 54. After a dwell, the cycle of operations may be repeated. The conveyor 11 is at rest with flights 12 thereon locating containers 16 at charge receiving position during the interval of portions 130, 131, 120, of the cam 101. The conveyor shifting may occur during a fraction of the measuring chamber filling operation.

While there may be the automatic cut-out for the filling, for one or more of the fillers as suggested, tying of an arm or cut out device for the non-filling may be manually effected by shifting the three-way valve 83 to cut off flow from the pipe 81 to the passage 89. Trigger 154 may be shifted against the arm or arms 134 to hold such from riding against the containers on the conveyor.

The general set-up as disclosed is one especially adapted for ready and thoro cleansing. This means that change-over may be made from one product or substance, to a markedly different substance, with no cause for contamination. Such makes it possible to operate with colored substances with no carry-over from one to the other. With food products, the straight line duct sections, permit quick washing out against any unsanitary condition arising. The plug valves 96 are easily removed, for by hand the torsion spring 115 may be overcome, to locate the arm 117 out of the way so that the plug 96 may be pulled out of its sleeve and washed, and attention given the passages to and from such sleeve. The ready taking-out of the piston from the cylinder 54 has been heretofore pointed out.

What is claimed and it is desired to secure by Letters Patent is:

1. A measuring apparatus embodying a fixed cylinder provided with a tapered head having a port, a piston for the cylinder having a complementary tapered portion for seating in the cylinder tapered head, a valve for the port, and a drive for the piston and valve including yieldable transmission means for urging the piston to engage the valve at said port.

2. A measuring apparatus including a piston, a cylinder, a slide-way adjacent the cylinder, and an intake and outlet valve reciprocable in the slide-way and in direct communication with the cylinder, said piston as operable in the cylinder abutting said valve.

3. A piston and cylinder measuring apparatus, a guide-way adjacent the cylinder, a valve in said way and having an intake port and an additional outlet port, and an actuator for positioning the valve to be abutted by the piston from outlet port registry at the cylinder to intake port registry and maintaining at all times one direction of flow as to the cylinder for each of said ports.

4. A liquid measuring apparatus embodying a cylinder, a piston, a guide-way adjacent the cylinder and having three ports, a plug in the way, said plug having two transverse ports, push means for sliding the plug in one direction lengthwise of the way to locate one of the ports of the plug for register with two of the ports of the way and positively rendering inactive the third port of the way and the second port of the plug with the piston at one position relatively to the cylinder, and reversely acting push means for the plug to retain one of the formerly active ports of the way now to be in communication thru what was the inactive port of the plug with said third port of the way with the piston at a different position relatively to the cylinder.

5. A liquid measuring apparatus valve embodying a sleeve, a plug in the sleeve, and push means for oppositely reciprocating the plug, said means including a plug abutting member manually shiftable transversely of the direction of the push means reciprocation to clear the plug for plug removal from the sleeve.

6. In a mechanism for filling containers, in combination, a measuring cylinder having a port for the introduction and discharge of material, said cylinder having spaced stops for limiting the reciprocatory movement of a piston positioned in said cylinder between the stops, and a device for actuating the piston to have contact with said stops alternately, which device includes resilient means for cushioning the impact of said piston against said stops, respectively.

7. The combination set forth in claim 6 in which means is provided whereby one of said stops may be adjusted from without the cylinder to vary the length of the piston stroke.

8. The combination set forth in claim 6 in which a valve is positioned adjacent said port to control the inflow and outflow of material, and means is provided for positively actuating said valve.

9. The combination set forth in claim 6 in which said actuating device includes a reciprocable member having a sleeve slidably mounted thereon, resilient means opposing sliding movement of the sleeve on said member, and means connecting the sleeve and piston.

10. A measuring cylinder having a common inlet and outlet port for fluids to be measured and dispensed, a valve member movably mounted adjacent said port and having two ducts therein, either of which may be brought into communication with said port, and mechanism for moving said valve including an element for moving the valve member in one direction and a second element for moving the valve member in the opposite direction, one of said elements being adapted to be rendered inoperative to move the valve.

11. The combination set forth in claim 10 in which the valve member is reciprocable in a straight line path and the said elements engage the ends thereof.

12. The combination set forth in claim 10 in which the valve member is reciprocable in a straight line path and one of said elements is adapted to swing in a plane transverse to said path into and out of the same.

13. The combination with a measuring and dispensing vessel having a discharge port and a valve member movably mounted adjacent said port for controlling the escape of liquids therefrom, means adapted to be positioned to engage the valve to move said valve to open the port or to be removed from valve engaging position, a member adjacent the port adapted to be moved by emplacement of a vessel in position to receive liquid discharged from said port, and mechanism connecting said member and means whereby the means is operatively connected to the valve only when said member is actuated, said means including a cam and said mechanism including a cam operating element which is removed from the path of the cam when said member is actuated.

14. A volume measuring apparatus embodying a series of measuring chambers, a conveyor adapted to transport means for receiving charges from the chamber in sequence, a drive for the conveyor having measuring effecting connections to the chambers, and selective cut out means having connections to defeat advance filling of a chamber independently of disturbing the drive for the conveyor.

15. A volume measuring apparatus embodying a measuring chamber, a longitudinally slidable control valve for the chamber, a conveyor for containers to receive charges from the chamber, a drive for the conveyor having measuring effecting connections to the chamber, automatic cut-out means to defeat advance filling of the chamber for measuring delivery independently of disturbing the drive for the conveyor, and additional manually operable means rendering operation of the automatic means alike to be non-effective for measuring delivery and independent of disturbing the drive for the conveyor.

16. A volume measuring apparatus embodying a measuring chamber, a slide-way below the chamber, a ported plug valve in the slide-way directly communicating with said chamber, and pusher means independent of the valve for reciprocating said valve and providing predetermined periods of valve rest between said reciprocations.

17. Liquid measuring apparatus embodying a piston and cylinder device, a drive therefor, a rod for the piston, and quick disconnection means for the piston and rod from the drive and cylinder comprising a lever, a hinge pin, seat means therefor, and a latch for retaining the pin in said seat and as disconnected, said lever being swingable clear of the rod to permit ready removal of the piston from the cylinder.

18. A liquid measuring apparatus valve embodying a sleeve providing a guide-way, a ported plug reciprocable lengthwise in the sleeve, and independently movable push means in addition to the plug and movable thereagainst in the direction of the plug reciprocation in said sleeve for positioning the plug at a plurality of positions in the sleeve.

CARLETON W. READE.
HENRY T. SCOTT.